(12) United States Patent
Henderson et al.

(10) Patent No.: US 9,002,788 B2
(45) Date of Patent: Apr. 7, 2015

(54) SYSTEM FOR CONFIGURABLE REPORTING OF NETWORK DATA AND RELATED METHOD

(75) Inventors: Karl M. Henderson, Arlington, VA (US); John Kenneth Gallant, Sterling, VA (US)

(73) Assignee: Verisign, Inc, Reston, VA (US)

( * ) Notice: Subject to any disclaimer, the term of this patent is extended or adjusted under 35 U.S.C. 154(b) by 237 days.

(21) Appl. No.: 13/251,147

(22) Filed: Sep. 30, 2011

(65) Prior Publication Data

US 2012/0084264 A1    Apr. 5, 2012

Related U.S. Application Data

(60) Provisional application No. 61/388,511, filed on Sep. 30, 2010.

(51) Int. Cl.
*G06F 17/30* (2006.01)
*H04L 29/08* (2006.01)

(52) U.S. Cl.
CPC .......... *H04L 67/06* (2013.01); *G06F 17/30115* (2013.01); *H04L 67/26* (2013.01)

(58) Field of Classification Search
CPC .................... G06F 17/30115; G06F 17/30091; G06F 17/30578
USPC ......... 707/672, 609, 613, 624, 628, 629, 632, 707/673, 790, 802, 627, 618, 781
See application file for complete search history.

(56) References Cited

U.S. PATENT DOCUMENTS

| | | | |
|---|---|---|---|
| 6,029,175 A | 2/2000 | Chow et al. | |
| 6,219,669 B1 | 4/2001 | Haff et al. | |
| 7,024,450 B1 * | 4/2006 | Deo et al. | 709/203 |
| 7,263,528 B2 | 8/2007 | Haff et al. | |
| 7,366,779 B1 * | 4/2008 | Crawford | 709/227 |
| 7,406,596 B2 | 7/2008 | Roumiantsev | |
| 7,565,422 B2 | 7/2009 | Campbell et al. | |

(Continued)

FOREIGN PATENT DOCUMENTS

WO    WO 2007/131190 A2    11/2007

OTHER PUBLICATIONS

International Search Report and Written Opinion issued in International Patent Application No. PCT/US2011/054208; 10 pages; date of mailing: Dec. 22, 2011.

*Primary Examiner* — Jay Morrison
*Assistant Examiner* — Dangelino Gortayo
(74) *Attorney, Agent, or Firm* — MH2 Technology Law Group, LLP

(57) ABSTRACT

Method and apparatus for transferring files between hosts including reading a first configuration file to obtain file retrieval criteria, logging into a retrieval host to retrieve a file based on the file retrieval criteria, saving retrieved file to a local host, reading a second configuration file to obtain file push criteria, including instructions for where to push the retrieved file, pushing the retrieved file to a push host based on the file push criteria, pushing an enabled hosts file from the local host to the push host, the enabled host file containing configuration criteria and sending a notification to the retrieval host if a file meeting the configuration criteria has not been retrieved from the retrieval host to the local host, or sending a notification from the local host to the push host if a file meeting the configuration criteria has not been pushed to the push host.

39 Claims, 9 Drawing Sheets

(56) References Cited

U.S. PATENT DOCUMENTS

| | | | |
|---|---|---|---|
| 7,610,355 B2 * | 10/2009 | Azuma et al. | 709/217 |
| 7,689,510 B2 | 3/2010 | Lamkin et al. | |
| 7,697,415 B2 * | 4/2010 | Dugan et al. | 370/216 |
| 7,792,995 B2 * | 9/2010 | Banerjee et al. | 709/245 |
| 7,810,144 B2 | 10/2010 | Haff et al. | |
| 8,005,859 B2 * | 8/2011 | Wagner | 707/781 |
| 8,078,688 B2 * | 12/2011 | Ansari et al. | 709/217 |
| 8,185,736 B2 * | 5/2012 | Haff et al. | 713/165 |
| 8,200,635 B2 * | 6/2012 | Mayer et al. | 707/641 |
| 8,307,096 B2 * | 11/2012 | Howard | 709/228 |
| 2003/0070063 A1 * | 4/2003 | Boyle et al. | 713/2 |
| 2003/0204690 A1 | 10/2003 | Yamada et al. | |
| 2006/0224620 A1 * | 10/2006 | Silverman et al. | 707/104.1 |
| 2008/0240373 A1 * | 10/2008 | Wilhelm | 379/67.1 |
| 2008/0271112 A1 | 10/2008 | Waker et al. | |
| 2009/0292790 A1 * | 11/2009 | Salonikios | 709/217 |

* cited by examiner

SYSTEM FOR CONFIGURABLE REPORTING OF NETWORK DATA AND RELATED METHOD

This application claims priority to U.S. Provisional Application No. 61/388,511, filed on Sep. 30, 2010, the disclosure of which is incorporated herein by reference in its entirety.

TECHNICAL FIELD

This disclosure is generally directed to systems and methods for transferring files to and from hosts, and more particularly, transferring files that meet a certain criteria.

BACKGROUND

File transfer tools are common system management tools. They are often bundled with Operating System installations. These tools provide capabilities to specify which file to pull, and from where to pull it. Known systems provide too low level of capability for performing large scale file transfers. While these systems may allow a user to transfer one file at a time, they are impractical for large, automatic file transfers.

Therefore, it is desirable to have a system capable of performing large scale file transfers. It is also desirable for a system to have criteria for which files to transfer and which to not transfer. This would speed mass file transfer and minimize the amount of space needed to store transferred files.

SUMMARY

Methods and system of transferring at least one file between hosts are described. One such preferably includes, reading a first configuration file to obtain file retrieval criteria, logging into a retrieval host to retrieve at least one retrieved file based on the file retrieval criteria, saving the at least one retrieved file to a local host, reading a second configuration file to obtain file push criteria, the file push criteria including instructions for where to push the at least one retrieved file, pushing the at least one retrieved file to a push host based on the file push criteria, pushing at least one enabled hosts file from the local host to the push host, the at least one enabled host file containing configuration criteria and sending a notification to the retrieval host if at least one file meeting the configuration criteria has not been retrieved from the retrieval host to the local host, or sending a notification from the local host to the push host if at least one file meeting the configuration criteria has not been pushed to the push host, or a combinations thereof.

Also described is a computer-readable memory storing instructions which, when executed on a processor, perform the described methods.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Disclosed embodiments include computer systems having a processor and that include computer-readable storage media that include code for instructions to perform disclosed processes. Disclosed embodiments can include any type of computer-readable memory or storage device, such as a random access memory, a read only memory, a mass storage device, such as a hard disk, CDs, DVDs, and the like. Disclosed embodiments can include monitors, track balls, mice, keyboards, and the like. Disclosed embodiments can be connected to computers using a network. Various computers can exchange information among the network. Disclosed embodiments can be deployed on any operation system or platform such as Linux based operating systems.

Disclosed embodiments relate to an Automatic File Transfer (AFT) system that provide the ability to securely retrieve large files on an automated recurring basis for multiple services. These files are then forwarded to appropriate applications on remote hosts that may then use the files. A host is a computer connected to a computer network. Thus, in disclosed embodiments the AFT system provides a network where files can be transferred from one host through the AFT to another host. Each host can have one or more addresses. These addresses, sometimes called Internet Protocol addresses or IP addresses, help the AFT identify from where a transferred file is coming or to where it is going. A remote host is a host on a remote computer. Transferring a file can include retrieving the file or pushing the file.

Figure 1:
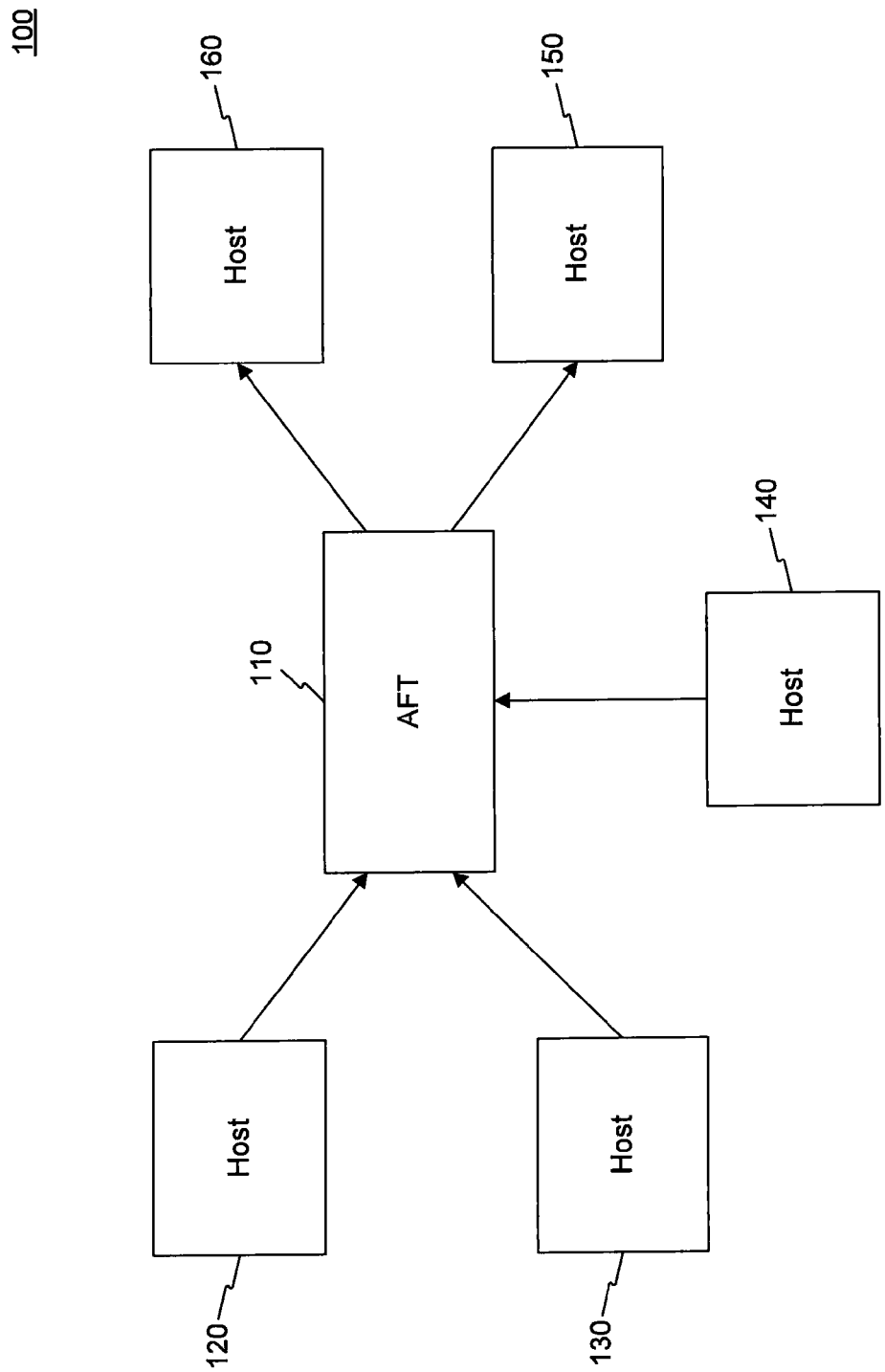
FIG. 1 is a block schematic for an Automatic File Transfer system, consistent with the disclosed embodiments.

FIG. 1 shows an AFT system network 100. AFT machine 110 can pull files from hosts 120, 130, and 140. AFT machine 110 can also push files to hosts 150 and 160. The AFT machine 110 can pull and push from any number of various hosts through a network. The AFT is run on a central machine. From the central machine, the user can configure a series of directories that configure multiple services. Each service can pull from multiple remote machines and push to other multiple machines. More than one AFT can be installed as needed. There can be different sub-directories for each service for different locations. For example, service A pulls from host B and site C, and the like.

The Automatic File Transfer system (AFT) can be divided into different functional areas. The first area is the retrieval of files from a remote host, for example, a private or public network computer or server that resides in some distant location from which data can be retrieved. Hosts can include directories for retrieving and pushing files to different machines. Each host directory corresponds to a remote machine. The retrieved files can come from various locations. The retrieved files can then be stored on a machine, such as a server or computer. Another functional area is the pushing of files from these servers or computers. Files can be pushed to remote hosts for use and storage on those machines. The AFT provides a rich set of features on top of a standard lower-level file transfer system.

Figure 2:
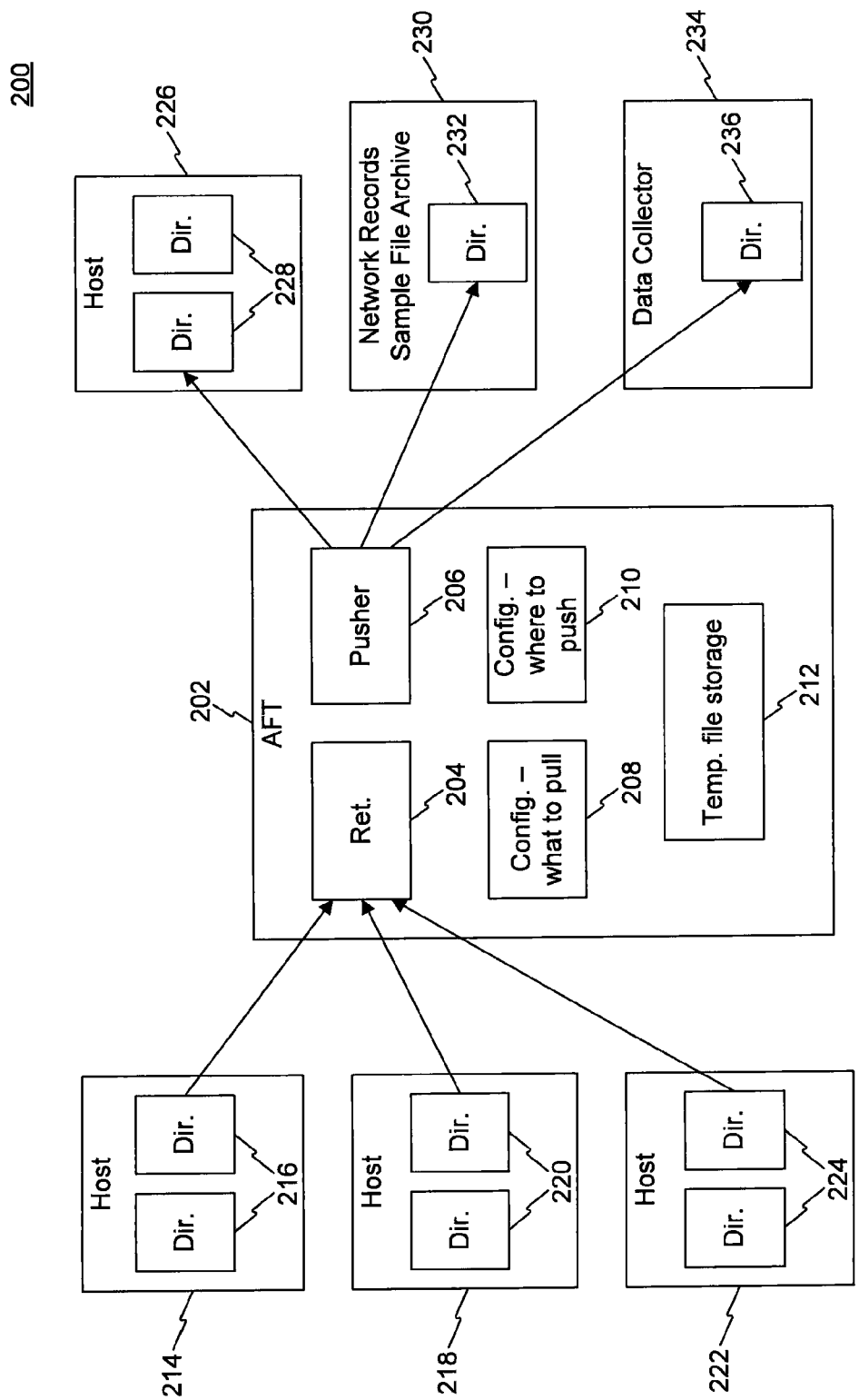
FIG. 2 is a detailed block schematic for an Automatic File Transfer system, consistent with the disclosed embodiments.

FIG. 2 shows an exemplary AFT system 200. AFT 202 includes retriever 204, pusher 206, configuration components 208 and 210, and temporary file storage 212. AFT 202 can retrieve files from directories 216, 220, and 224 located on hosts 214, 218, and 222 using retriever 204. Files can be pushed to directories 228, 232, and 236 located on host 226, records archive 230, and data collector 234.

Retriever 204 retrieves files from hosts' directories, such as host 214 and directories 216. In some embodiments, AFT 202 continually examines and scans these remote directories where files are stored. The retriever receives instructions from a configuration component 208. Configuration component 208 relays to the retriever what to pull. This may include specific files to pull, a time of day to pull files, which host to pull certain files from and other criteria that can be used to pull files. Configuration component 208 can instruct AFT whether or not to continually examine and scan a host's directories for files to pull. If some files meet certain criteria, as set out in configuration component 208, these files will be pulled. These files can include many different file types. These files are then pushed to various destinations. A record can be maintained in the AFT as to what files have been pulled, so that those files may not be pulled again.

Operations personnel can initially configure various parameters in the configuration module by programming a configuration file, sometimes called a control file. After this initial configuration, the AFT can continually work without personnel reprogramming it. Thus, file transfers can occur automatically and continually. Once files are pulled, other configuration components may be consulted to determine where to push the file, whether to retain a copy locally, and the like. The AFT will be described in greater detail below.

A retriever 204 looks in the remote host's directory for files matching the pertinent configuration information, and pulls those files back to the AFT. Retriever 204 uses process logic to determine which files to pull. This makes use of the AFT's higher level capabilities in addition to the lower level capabilities provided by the transferring tool rsync. For example, a higher level capability can be to pull only files that were created during certain times during the day or to pull file names based on pattern matching.

The AFT 202 may transfer files using rsync, software that synchronizes files and directories from one location to another. Rsync is a software application that can be run on various operating systems. Rsync is used in disclosed embodiments to transfer files by either pushing or pulling the files. Rsync minimizes data transfer by only transferring parts of a file that are not found on the destination host. For example, if a file is to be transferred to a destination host, and the destination host has most of the file and is only missing a newly added part of a file, then only that newly added part will be transferred to the destination host, thus limiting the total amount of data transferred.

After a file is pulled, and before the file is pushed, the file may be moved to a temporary storage location 212. This temporary storage location acts as a buffer between the retriever and push system. The temporary storage location can include a plurality of directories and folders. When it is decided to push a file, it is retrieved from the temporary storage 212 and then pushed. Pusher 206 can be configured, for example, to provide a destination location or address, for one host at a time, or for a plurality of hosts.

Pusher 206 pushes files to hosts' directories, such as host 226 and directories 228, using a similar configuration scheme as described above for the retriever. Configuration module 210 includes instructions for where to push a file, as will be described in greater detail below. The configuration can also retain an archived copy of a pushed file on the AFT machine.

AFT 202 can pull sample files from hosts such as network recorders. Network recorders create a large amount of disk data by recording and storing many files from a network, which may not all be suitable for transferring due to the size of the files. AFT 202 can employ sampling filters, configured into the configuration, to greatly reduce the number of files retrieved. After these sample files are pulled, these files are pushed to an archive, such as records archive 230 directory 232, as shown in FIG. 2. Files can also be pushed to directory 236 of a data collector 234. This pushing can include pushing an enabled hosts file, which can be created on the AFT machine and contains a list of currently active applications, to data collector 234. The enabled hosts files will be described in more detail below.

In addition, in some embodiments, there may be hierarchical levels of configuration for the AFT. In these embodiments, there may be three levels of configuration: global, host, and application. The more specific configuration overrides the more general. For example, if there is a configuration setting on the global level, it can be overridden by a host level configuration for a specific host. Furthermore, both of these can be overridden on an application level for a host supporting multiple applications. Thus, it is possible to have global configuration parameters that would hold for multiple services and hosts, and have local configuration parameters that would hold for a particular service and host. The local parameters will override the global parameters. Thus still, an application on a host can have application parameters, which will override both the local and global parameters. This provides a hierarchical configuration of where to pull from and where to push to and enforces object inheritance.

Figure 3:
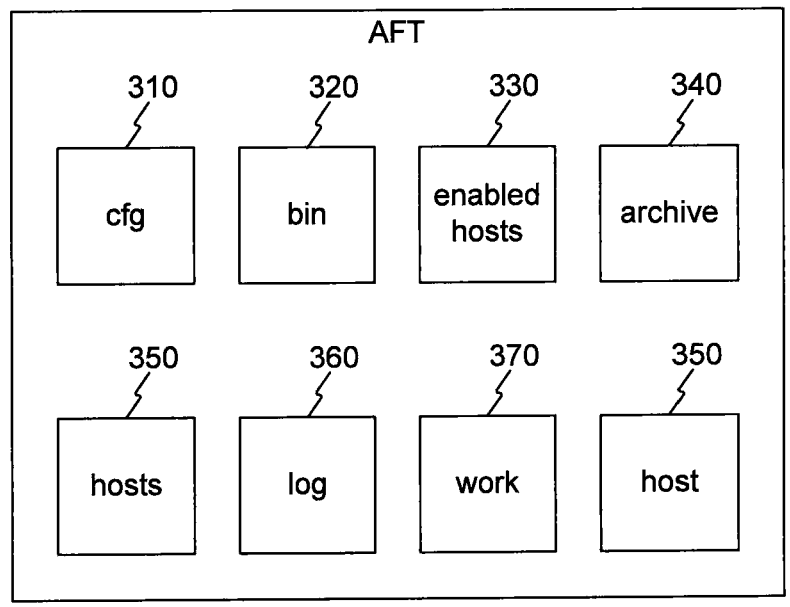
FIG. 3 is a block schematic for an Automatic File Transfer machine, consistent with the disclosed embodiments.

An AFT system can include various directories as shown in the example shown in FIG. 3. AFT 300 can include a configuration directory 310, which includes files containing configurations for the AFT, which provide instructions for the AFT. Bin 320 contains executable files and scripts, which are used in the pulling and pushing of files. Enabled hosts directory 330 contains enabled hosts files which include configuration criteria which are used to send a notification if a change happens to a hosts. Archive directory 340 contains files that are saved after pushing. Hosts directories 350 contains files for pulling and pushing to host machines. Each host directory 350 corresponds to a remote machine. Log directory 360 contains log files for the AFT machine. This directory can include information about what files have been transferred to make sure duplicates are not transferred. Work directory 370 is a directory where files can be temporally stored and worked on before pushing to a host. AFT 300 may contain other directories not shown in this example.

Figure 4:
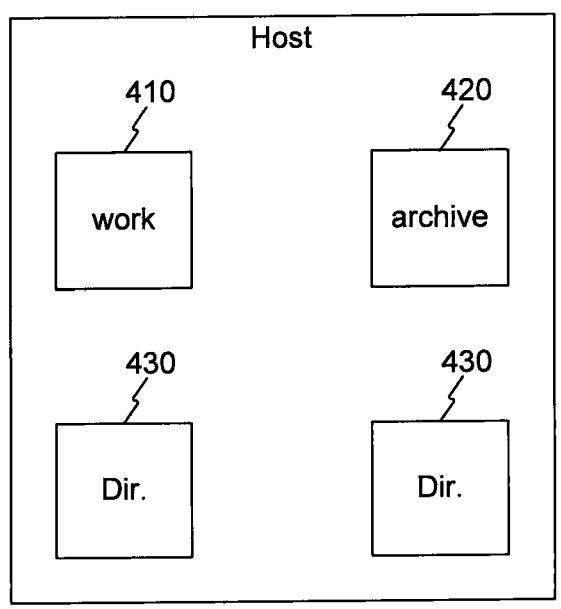
FIG. 4 is a block schematic for a host machine, consistent with the disclosed embodiments.

FIG. 4 is an exemplary host directory. Host directory 400 can include a work directory 410 that may temporally store files before pushing to a particular host. Archive directory 420 may contain files that are saved after pushing to a particular host. Directories 430 can contain any other files that may be used in the transferring of files to a particular host. A host directory may contain other directories not shown in this example.

Figure 5:
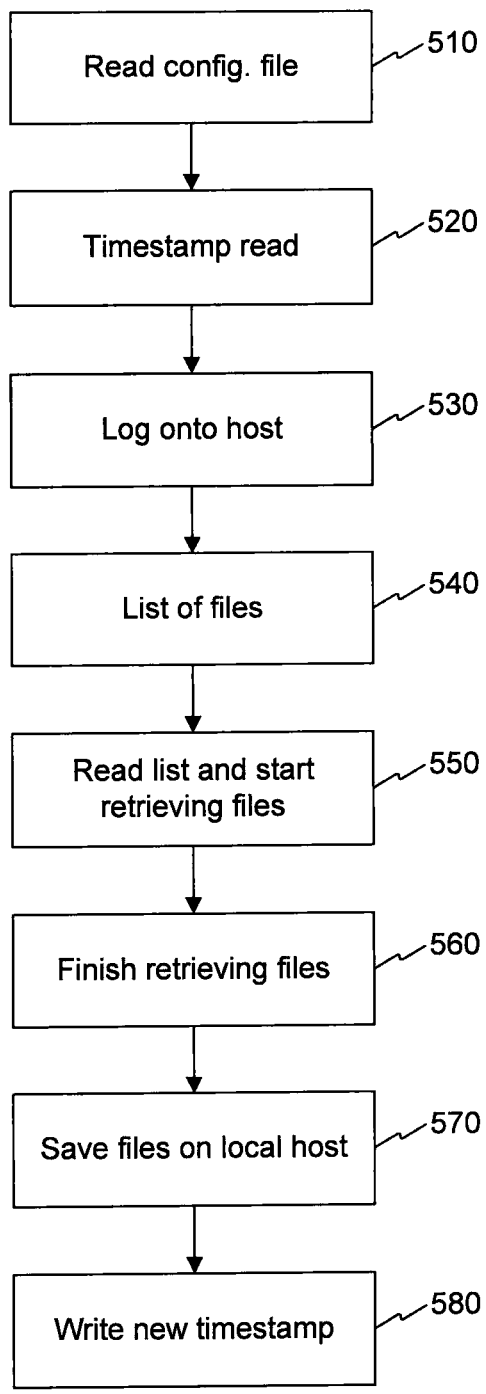
FIG. 5 is a detailed flow chart for retrieving a file, consistent with the disclosed embodiments.

FIG. 5 shows a flowchart of an embodiment for retrieving a file. A retriever uses information stored in a configuration file to obtain a list of hosts to retrieve from and to obtain which files types to retrieve. A configuration file can be set by a user according to several features. These features will be described below. The retriever starts by reading this configuration file, shown at block 510. The retriever then determines from which host to retrieve and which files types to retrieve. At block 520, a timestamp of the last retrieved file for this host-file type is read from a timestamp file. The timestamp file records the time a last file was transferred.

At block 530, an rsync process is executed to log into the host in order to start retrieving files. The list of files to retrieve is then obtained at block 540. The list can be created using the timestamp information obtained at step 520. The timestamp information can be used to create a list of files from the host that meet certain criteria. These criteria can include, whether files meet a certain file format, if the dates of the files have been modified, if a file with a modified date is later than the timestamp of a last retrieved file, whether a file is within a certain time range with in a day, such as between 10:05 and 14:00 hours, whether a file is within a certain hour of the day, or combinations thereof.

Then at block 550, the list is read and an rsync process is executed to start retrieving the listed files from the host. The rsync process finishes retrieving the files, shown at block 560. At block 570, the retrieved files are saved on a local host until the rsync execution task is complete. The local host is on the AFT machine. After a successful retrieval, a new timestamp is written to the timestamp file, as shown at 580.

The retriever can have global, host, or application specific configuration properties, or combinations thereof. Global properties apply to all hosts, host properties apply only to a single host, and application properties apply to a specific application or program. For example, local configurations will apply configurations locally, such as for a specific host, while global configurations will apply configurations globally, such as for a range of hosts. When there is more than one configuration, however, the local configuration will over-ride the global configuration, and the application configuration will over-ride both the local and global, as will be seen in the pushing of files below, but can likewise apply for retrieving files as well.

A second aspect of the AFT is the pushing of files to a remote host. There are many scenarios where a file will be pushed using the AFT. For example, pushing files used by certain applications on a remote hosts from AFT machines to those remote hosts for the applications, pushing output files, retrieved from certain applications, from the AFT machine to a data collector machine, pushing an enabled hosts file, which can be created on the AFT machine and contains a list of currently active applications, to a data collector machine. There are, however, many other scenarios wherein a file will be pushed using the AFT. A more generalized process will be outlined below wherein a file will be pushed using the AFT.

A push function transfers files from a local AFT machine to a configured remote machine. Here, a configured remote machine is a machine that is configured to have files pushed to it by the AFT. The push function scans directories for files to push. For example, if a new file has been pulled and is now located on the AFT machine, the push function will scan and detect the new file and will push it given the file matches the push configuration criteria. The push function can be configured to scan certain directories and not to scan other directories. The push function, however, can be configured to work on any directory structure or operating system setup. Most directory structures include the use of folders and storing files and other subfolders within larger folders in a hierarchical structure.

The push function scans many directories to find a file to push. When the push function finds a new file by scanning directories, the push function transfers, or pushes, the file to another directory. The push function knows where and how to transfer a file by reading a configuration file, sometimes called a control file. From here, the file is transferred to a remote machine using rsync. The control file contains many attributes, such as an IP address of the remote host and various rsync parameters such as rsync password, rsync timeout that stops rsync if no data transferred for a specified time, and a rsync module to use on a remote machine which specifies what directory the files are pushed to on the remote machine. The file name and path are also transferred to the host along with the file. The AFT can likewise push files to several unique hosts.

Figure 6:
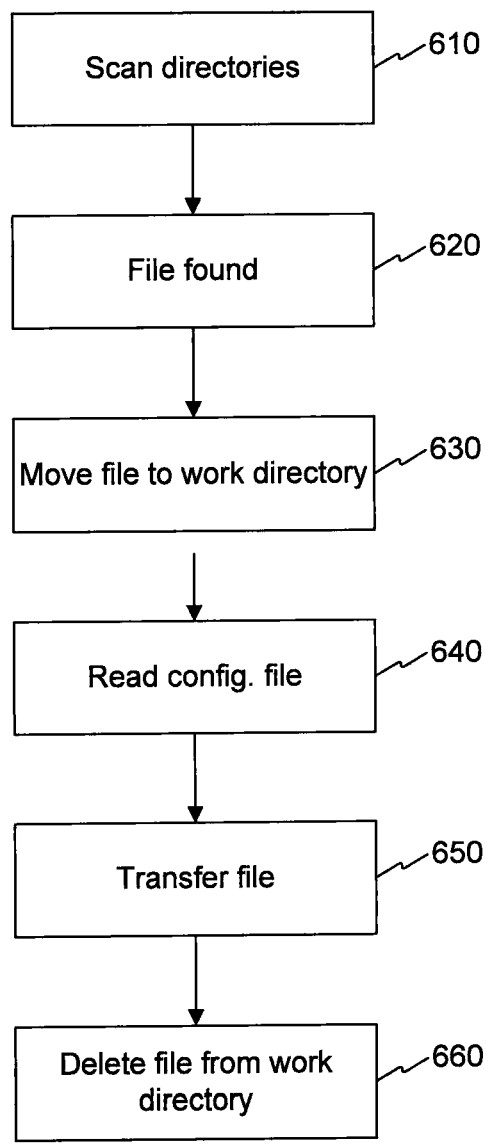
FIG. 6 is a detailed flow chart for pushing a file without archiving, consistent with the disclosed embodiments.

The operation of the push function can include different scenarios. One scenario includes pushing a file and archiving the file, and another scenario includes pushing a file without archiving. FIG. 6 illustrates a flowchart for a process 600 that includes pushing and no archiving. At block 610, the push function starts by scanning configured push directories for new files. Configured push directories are directories that are configured to have files pushed from them by the AFT. These directories can be located on the AFT machine in local hosts, as well as other remote hosts and machines. When a new file is found, shown at block 620, it is moved to a configured work directory, shown at block 630. Again, the word "configured" as used here means that the work directory is configured to work with the AFT system. The work directory is a temporary location for the file such that work can be performed on the file before transferring it to a remote host.

At block 640, the push function reads a control file. First, the push function looks to read a local control file using, for example, a script or macro program. The local control file includes configurations that tell the push function where to send the file, how to send it, and whether or not to archive it. The local control file typically includes configurations specific for a single host. If a local control file does not exists, the push function will then read a global control file. The global control file typically includes configurations for a range of hosts. This is an example of the hierarchical structure of the AFT. The AFT will first looks to see if a local control file is available to control the pushing, and then will look for a global control file if a local one is not found.

The control file includes many additional attributes that tell the push function where and how to transfer the file. These attributes as well as the configuration file are described in greater detail below.

After reading either the local or global control file, the push function transfers the file to a host using rsync, shown at block 650. After the transfer, the file is deleted from the work directory, shown at block 660.

Figure 7:
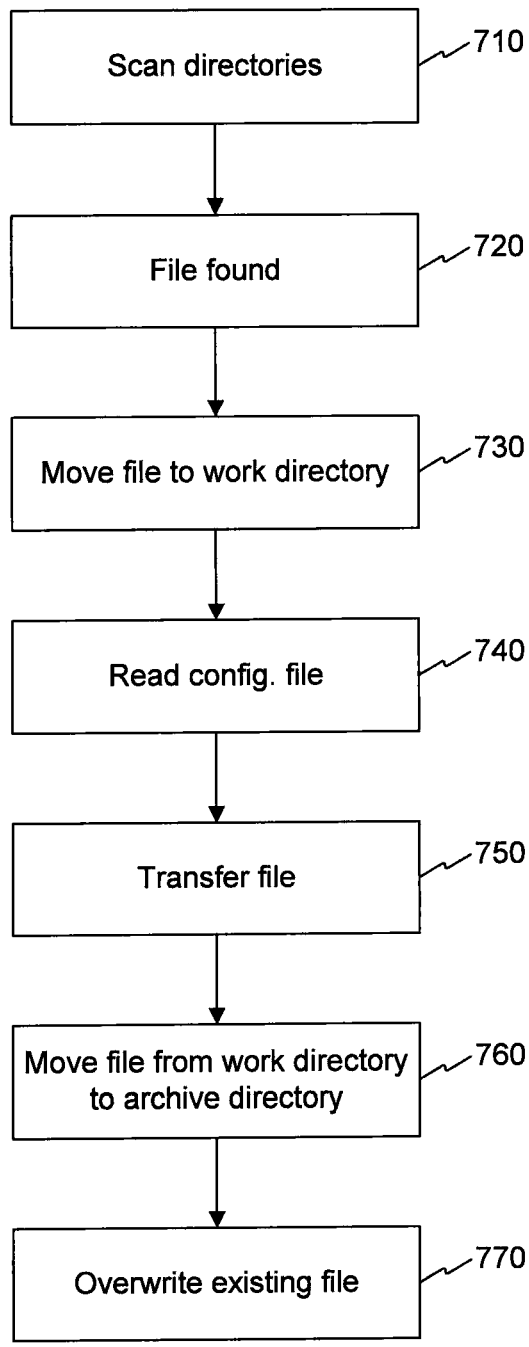
FIG. 7 is a detailed flow chart for pushing a file with archiving, consistent with the disclosed embodiments.

FIG. 7 illustrates a flowchart for a process 700 that includes pushing and archiving. The process 700 starts by having the push function scan configured directories for a host, shown at block 710. After a new file is found, shown at block 720, it is moved to a configured work directory, shown at block 730. Again, the work directory provides a temporary location for the file before transferring it to a host. At block 740, the push function reads either a local or global control file, which is described above, and at block 750 transfers the file to a host using rsync. After the transfer, a copy of the file is moved from the work directory to an archive directory, where it can be saved for future uses, shown at block 760. Already existing files in the archive directory may be overwritten depending on space and memory, shown at block 770. In the case of process 700, the control file, either global, local, or application, includes a configuration to move the file to an archive directory.

The configuration can provide many features for both the retriever and for the pusher. The configuration file can be configured in a number of ways which provide for how and where the file will be handled in both the push case and the pull case. For example, the configuration file can let the AFT know a certain number of files to pull simultaneously from a remote host such as when the remote host directory to be pulled from has multiple files that have not been pulled yet. The configuration file can let the AFT know the number of files to pull simultaneously across the summation of all host being pulled. The configuration file can let the AFT know the amount of bandwidth to use during a transfer for one or a collection of hosts. The configuration file can also let the AFT know a pattern to be matched in the file name, file contents, or metadata of a file to be pulled, and the like.

Also filters that filter transferred files can be included in the configuration file. A filter can specify certain time periods during the day to pull files with certain attributes, such as the timestamp of the file, and to not pull files not meeting this criteria. For example, these filters can include parameters for pulling certain files that have a timestamp within a certain range within an hour or for pulling certain files that have a time-stamp within certain hours within a day, and the like. Another example of a filter could be a filter that specifies the maximum number of files that can be retrieved within a certain time period. Thus, once this threshold is met, no more files will be pulled.

Another feature that can be included in the configuration file is a global push control file that specifies overrides for individual destinations. This can make configuration of passwords and protocol configurations easier for an operator to maintain. Multiple AFTs can be deployed with some pulling from some hosts and not pulling from others. The AFT can have a configurable timestamp property such that only files with a timestamp greater or less than a configured property can be retrieved. The AFT can have the option to retrieve only files that fall within a configurable number of hours after the start of the day. The AFT can have the option to retrieve files with a timestamp that falls within a configurable number of minutes after the start of an hour. The AFT can have an option to retrieve a predetermined number of files from the start of an hour created within that hour. All of these properties can be included in a configuration file.

Figure 8:
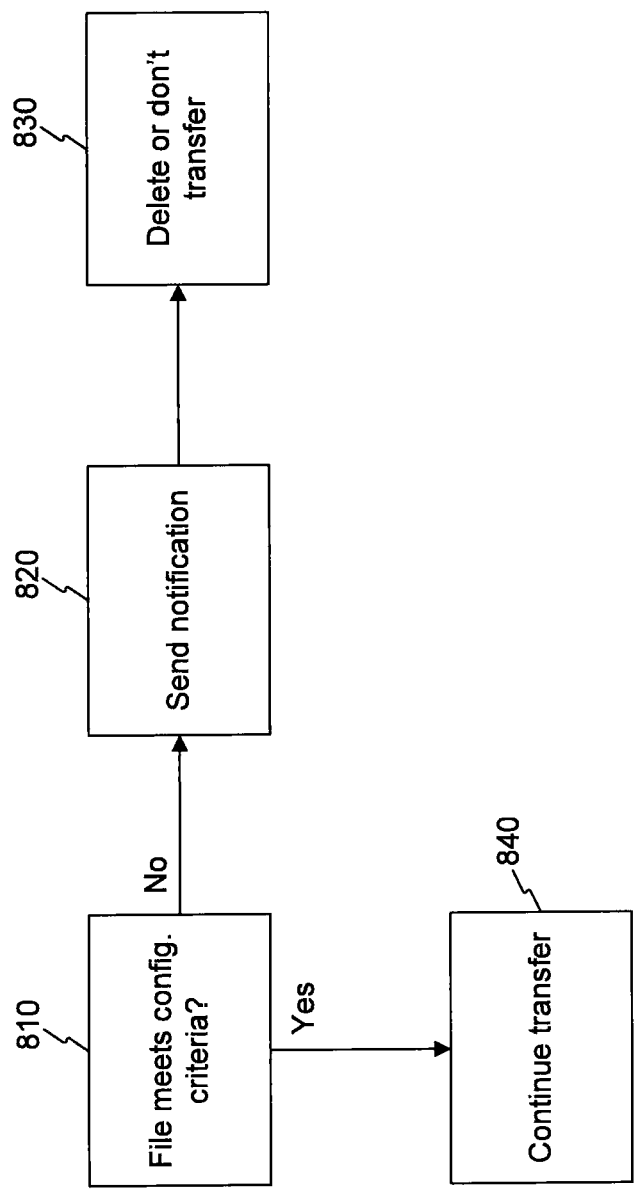
FIG. 8 is a first block schematic for an enabled hosts file, consistent with the disclosed embodiments.
Figure 9:
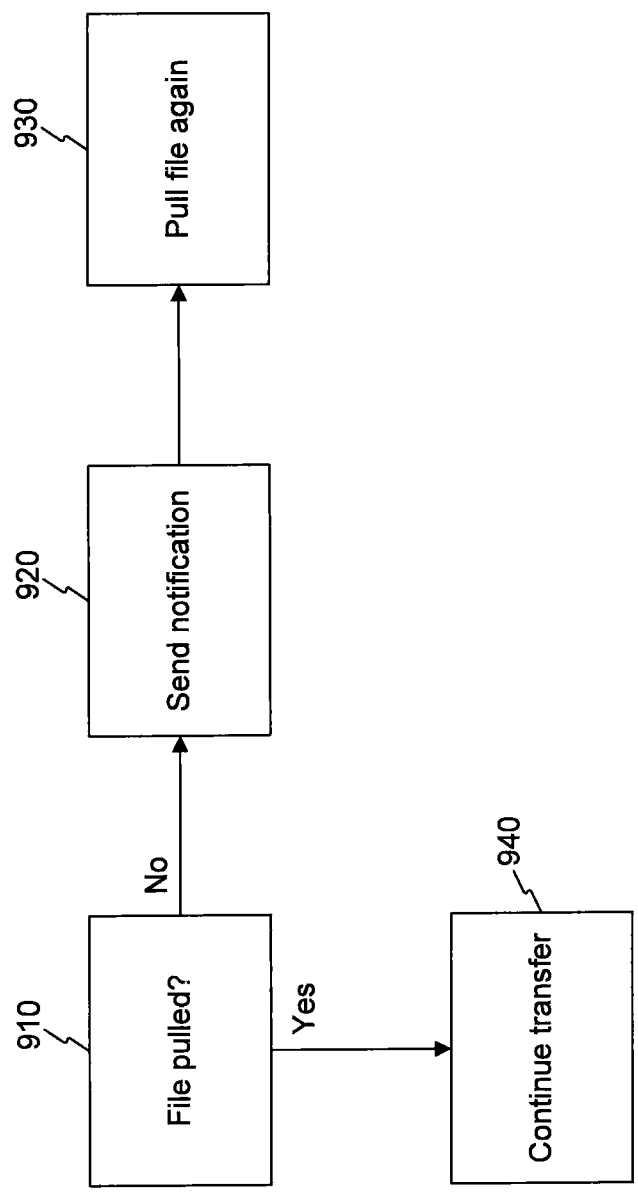
FIG. 9 is a second block schematic for an enabled hosts file, consistent with the disclosed embodiments.
Figure 10:
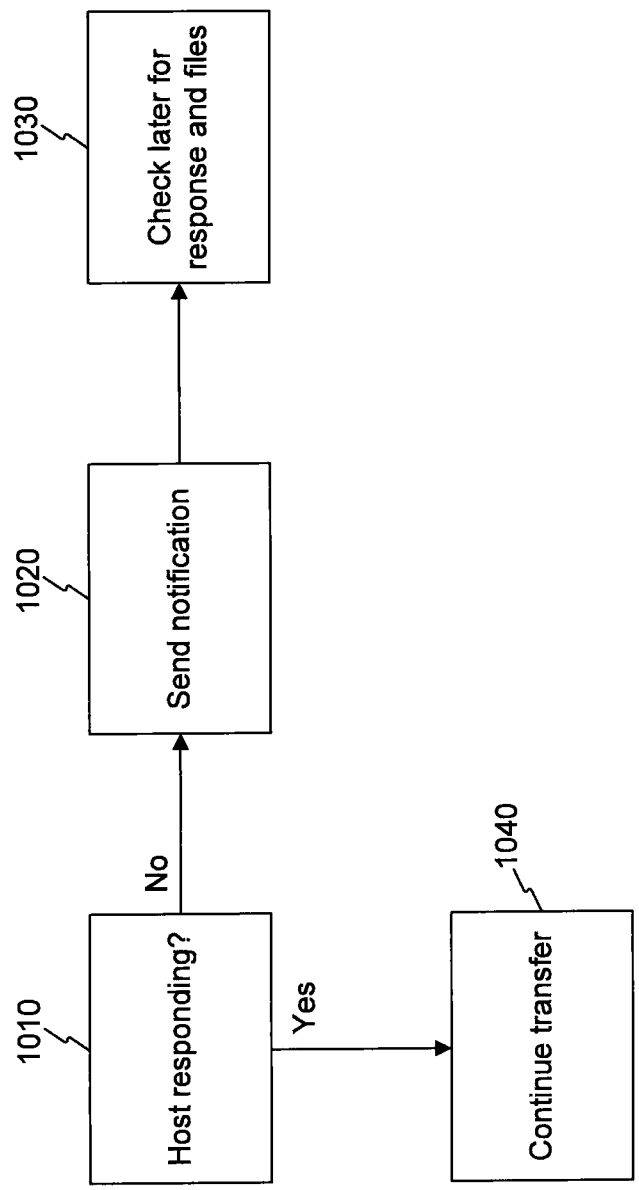
FIG. 10 is a third block schematic for an enabled hosts file, consistent with the disclosed embodiments.

FIGS. 8, 9, and 10 show processes for an enabled hosts file. Enabled hosts files contain configuration criteria, such as described above. In FIG. 8, after an enabled hosts file is pushed to a host, it is determined if files that have been pulled or pushed meet certain specifics of a configuration file, shown at block 810. If not, a notification will be sent to a host (block 820), and those files that do not meet the criteria may be deleted or not transferred (block 830). If the files do meet certain specifics of the configuration file, the AFT continues to transfer files.

Process 900 is shown in FIG. 9. In this process, after an enabled hosts file is pushed to a host, it is determined if files meeting a certain configuration criteria have been pulled or pushed, shown at block 910. If not, a notification will be sent to a host (block 920), and the files will try to be pulled or pushed again (block 930). If the files that meet certain configuration criteria have been pulled or pushed, the AFT continues to transfer files.

The enabled host file can also be used to check to see if a host is responding or if a new host had been added. For example, the enabled host file can indicate that certain hosts are responding by seeing if they are available, because, for example, they were just added, or unavailable, because, for example, they are undergoing maintenance or having an error that prevents a file from being transferred, and therefore may not respond. Process 1000 is shown in FIG. 10. It is determined if a host is responding (block 1010). If not, a notification will be sent to a host (block 1020), and the AFT can then check at a later time period that host for files to be transferred (block 1030). If a host is responding, it may be determined if it is a new host. Either way, if a host is responding, the transfer will continue (block 1040).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of transferring at least one file between hosts, comprising:
    reading, by a local host, a first configuration file to obtain file retrieval criteria;
    accessing, by the local host, a retrieval host to retrieve at least one retrieved file based on the file retrieval criteria;
    saving the at least one retrieved file to the local host;
    reading, by the local host, a second configuration file to obtain file push criteria, the file push criteria including instructions for where to push the at least one retrieved file;
    pushing, by the local host, the at least one retrieved file to a push host based on the file push criteria;
    generating, by the local host, at least one enabled hosts file, wherein the at least one enabled hosts file comprises configuration criteria relating to whether a host is not responding or whether a host has been added;
    pushing, by the local host, the at least one enabled hosts file from the local host to the push host; and
    sending, by the local host, a notification to the retrieval host if at least one file meeting the configuration criteria has not been retrieved from the retrieval host, or sending a notification from the local host to the push host if at least one file meeting the configuration criteria has not been pushed to the push host, or a combination thereof,
    wherein at least one of the first or the second configuration files include at least one global, host, and application configuration levels, wherein the global configuration level includes criteria specific for multiple hosts, the host configuration level includes criteria specific for a specific host, and the application configuration level includes criteria specific for a specific application.

2. The method of claim 1, further comprising:
    reading a timestamp file to obtain a timestamp of a last retrieved file; and
    writing a new timestamp for the at least one retrieved file.

3. The method of claim 1, further comprising:
    copying the at least one retrieved file while the at least one retrieved file is still on the local host; and
    moving the copy to an archive directory.

4. The method of claim 3, further comprising:
    overwriting an existing file in the archive directory with the copy.

5. The method of claim 1, further comprising:
moving the at least one retrieved file to a local directory;
accessing the at least one retrieved file in the local directory; and
deleting the at least one retrieved file after pushing the at least one retrieved file to the push host.

6. The method of claim 1, wherein the file retrieval criteria includes instructions to:
continually scan a plurality of hosts and directories on the plurality of hosts; and
based on the file retrieval criteria, logging into at least one of the plurality of hosts to begin retrieving the at least one retrieved file.

7. The method of claim 1, further comprising:
accessing a plurality of local directories located in the local host;
wherein the file push criteria includes instructions to:
continually scan the plurality of local directories to find the at least one retrieved file; and
based on the file push criteria, accessing the at least one retrieved file located in one of the plurality of local directories to push the at least one retrieved file.

8. The method of claim 1, further comprising:
sending a notification to the retrieval host or to the push host if a host is not responding or if a host has been added.

9. The method of claim 1, wherein the file retrieval criteria includes instructions for identifying at least one of the following:
specific files to pull, a time of day to pull files, from which host to pull certain files, a number of files to pull simultaneously from a host, a number of files to pull simultaneously across a plurality of hosts being pulled from, an amount of bandwidth to use during a retrieval, a pattern to be matched in a file name or file contents of a file to be pulled, time periods during a day to pull files with specified attributes, parameters for pulling files that have a timestamp within a predetermined range, parameters for pulling files that have a timestamp within specified minutes within hours of a day, parameters for pulling files that have a timestamp within specified hours within a day, a maximum number of files that can be retrieved within a predetermined time period, or combinations thereof.

10. The method of claim 1, wherein the file push criteria includes instructions for identifying at least one of the following:
specific files to push, a time of day to push files, to which host to push certain files, a number of files to push simultaneously to a host, a number of files to push simultaneously across a plurality of hosts, an amount of bandwidth to use during a push, a pattern to be matched in a file name or file contents of a file to be pushed, time periods during a day to push files with specified attributes, parameters for pushing files that have a timestamp within a predetermined range, parameters for pushing certain files that have a timestamp within specified minutes within hours of a day, parameters for pushing files that have a timestamp within specified hours within a day, a maximum number of files that can be pushed within a predetermined time period, or combinations thereof.

11. The method of claim 1, wherein if two or more configuration levels are read, the host configuration level overrides the global configuration level, and the application configuration level overrides both the host and the global configuration levels.

12. The method of claim 1, further comprising determining, by the local host, that at least one of at least one file meeting the configuration criteria has not been retrieved from the retrieval host and at least one file meeting the configuration criteria has not been pushed to the push host occurs.

13. The method of claim 1, wherein the configuration criteria comprises information related to a status of any, or combinations of, the retrieval host and the push host.

14. A non transitory computer-readable medium including instructions to perform a method of transferring at least one file between hosts, the method comprising:
reading, by a local host, a first configuration file to obtain file retrieval criteria;
accessing, by the local host, a retrieval host to retrieve at least one retrieved file based on the file retrieval criteria;
saving, by the local host, the at least one retrieved file to the local host;
reading, by the local host, a second configuration file to obtain file push criteria, the file push criteria including instructions for where to push the at least one retrieved file;
pushing, by the local host, the at least one retrieved file to a push host based on the file push criteria;
generating, by the local host, at least one enabled hosts file, wherein the at least one enabled hosts file comprises configuration criteria relating to whether a host is not responding or whether a host has been added;
pushing, by the local host, the at least one enabled hosts file from the local host to the push host; and
sending, by the local host, a notification to the retrieval host if at least one file meeting the configuration criteria has not been retrieved from the retrieval host, or sending a notification from the local host to the push host if at least one file meeting the configuration criteria has not been pushed to the push host, or a combination thereof,
wherein at least one of the first or the second configuration files include at least one global, host, and application configuration levels, wherein the global configuration level includes criteria specific for multiple hosts, the host configuration level includes criteria specific for a specific host, and the application configuration level includes criteria specific for a specific application.

15. The non transitory computer-readable medium of claim 14, the method further comprising:
reading a timestamp file to obtain a timestamp of a last retrieved file; and
writing a new timestamp for the at least one retrieved file.

16. The non transitory computer-readable medium of claim 14, the method further comprising:
copying the at least one retrieved file while the at least one retrieved file is still on the local host;
and moving the copy to an archive directory.

17. The non transitory computer-readable medium of claim 16, the method further comprising:
overwriting an existing file in the archive directory with the copy.

18. The non transitory computer-readable medium of claim 14, the method further comprising:
moving the at least one retrieved file to a local directory;
accessing the at least one retrieved file in the local directory; and
deleting the at least one retrieved file after pushing the at least one retrieved file to the push host.

19. The non transitory computer-readable medium of claim 14, wherein the file retrieval criteria includes instructions to:
continually scan a plurality of hosts and directories on the plurality of hosts; and based on the file retrieval criteria, logging into at least one of the plurality of hosts to begin retrieving the at least one retrieved file.

20. The non transitory computer-readable medium of claim 14, the method further comprising:
accessing a plurality of local directories located in the local host;
wherein the file push criteria includes instructions to:
continually scan the plurality of local directories to find the at least one retrieved file; and
based on the file push criteria, accessing the at least one retrieved file located in one of the plurality of local directories to push the at least one retrieved file.

21. The non transitory computer-readable medium of claim 14, the method further comprising:
sending a notification to the retrieval host or to the push host if a host is not responding or if a host has been added.

22. The non transitory computer-readable medium of claim 14, wherein the file retrieval criteria includes instructions for identifying at least one of the following:
specific files to pull, a time of day to pull files, from which host to pull certain files, a number of files to pull simultaneously from a host, a number of files to pull simultaneously across a plurality of hosts being pulled from, an amount of bandwidth to use during a retrieval, a pattern to be matched in a file name or file contents of a file to be pulled, time periods during a day to pull files with specified attributes, parameters for pulling files that have a timestamp within a predetermined range, parameters for pulling files that have a timestamp within specified minutes within hours of a day, parameters for pulling files that have a timestamp within specified hours within a day, a maximum number of files that can be retrieved within a predetermined time period, or combinations thereof.

23. The non transitory computer-readable medium of claim 14, wherein the file push criteria includes instructions for identifying at least one of the following:
specific files to push, a time of day to push files, to which host to push certain files, a number of files to push simultaneously to a host, a number of files to push simultaneously across a plurality of hosts, an amount of bandwidth to use during a push, a pattern to be matched in a file name or file contents of a file to be pushed, time periods during a day to push files with specified attributes, parameters for pushing files that have a timestamp within a predetermined range, parameters for pushing certain files that have a timestamp within specified minutes within hours of a day, parameters for pushing files that have a timestamp within specified hours within a day, a maximum number of files that can be pushed within a predetermined time period, or combinations thereof.

24. The non transitory computer-readable medium of claim 14, wherein if two or more configuration levels are read, the host configuration level overrides the global configuration level, and the application configuration level overrides both the host and the global configuration levels.

25. The non transitory computer-readable medium of claim 14, further comprising determining, by the local host, that at least one of at least one file meeting the configuration criteria has not been retrieved from the retrieval host and at least one file meeting the configuration criteria has not been pushed to the push host occurs.

26. The non transitory computer-readable medium of claim 14, wherein the configuration criteria comprises information related to a status of any, or combinations of, the retrieval host and the push host.

27. A system for transferring at least one file between hosts, comprising:
a memory storing instructions; and
at least one processor coupled to the memory and executing the instructions to perform the following steps:
reading a first configuration file to obtain file retrieval criteria;
accessing a retrieval host to retrieve at least one retrieved file based on the file retrieval criteria;
saving the at least one retrieved file to a local host;
reading a second configuration file to obtain file push criteria, the file push criteria including instructions for where to push the at least one retrieved file;
pushing the at least one retrieved file to a push host based on the file push criteria;
generating, by the local host, at least one enabled hosts file, wherein the at least one enabled hosts file comprises configuration criteria relating to whether a host is not responding or whether a host has been added;
pushing at least one enabled hosts file from the local host to the push host, the at least one enabled host file containing configuration criteria; and
sending a notification to the retrieval host if at least one file meeting the configuration criteria has not been retrieved from the retrieval host to the local host, or sending a notification from the local host to the push host if at least one file meeting the configuration criteria has not been pushed to the push host, or a combination thereof,
wherein at least one of the first or the second configuration files include at least one global, host, and application configuration levels, wherein the global configuration level includes criteria specific for multiple hosts, the host configuration level includes criteria specific for a specific host, and the application configuration level includes criteria specific for a specific application.

28. The system of claim 27, the at least one processor executing the instructions to perform:
reading a timestamp file to obtain a timestamp of a last retrieved file; and
writing a new timestamp for the at least one retrieved file.

29. The system of claim 27, the at least one processor executing the instructions to perform:
copying the at least one retrieved file while the at least one retrieved file is still on the local host;
and moving the copy to an archive directory.

30. The system of claim 29, the at least one processor executing the instructions to perform:
overwriting an existing file in the archive directory with the copy.

31. The system of claim 27, the at least one processor executing the instructions to perform:
moving the at least one retrieved file to a local directory;
accessing the at least one retrieved file in the local directory; and
deleting the at least one retrieved file after pushing the at least one retrieved file to the push host.

32. The system of claim 27, the at least one processor executing the instructions to perform:
continually scan a plurality of hosts and directories on the plurality of hosts; and based on the file retrieval criteria, logging into at least one of the plurality of hosts to begin retrieving the at least one retrieved file.

33. The system of claim 27, further comprising:
accessing a plurality of local directories located in the local host;
wherein the file push criteria includes instructions to:
continually scan the plurality of local directories to find the at least one retrieved file; and
the at least one processor executing the instructions to perform:
based on the file push criteria, accessing the at least one retrieved file located in one of the plurality of local directories to push the at least one retrieved file.

34. The system of claim 27, the at least one processor executing the instructions to perform:
sending a notification to the retrieval host or to the push host if a host is not responding or if a host has been added.

35. The system of claim 27, wherein the file retrieval criteria includes instructions for identifying at least one of the following:
specific files to pull, a time of day to pull files, from which host to pull certain files, a number of files to pull simultaneously from a host, a number of files to pull simultaneously across a plurality of hosts being pulled from, an amount of bandwidth to use during a retrieval, a pattern to be matched in a file name or file contents of a file to be pulled, time periods during a day to pull files with specified attributes, parameters for pulling files that have a timestamp within a predetermined range, parameters for pulling files that have a timestamp within specified minutes within hours of a day, parameters for pulling files that have a timestamp within specified hours within a day, a maximum number of files that can be retrieved within a predetermined time period, or combinations thereof.

36. The system of claim 27, wherein the file push criteria includes instructions for identifying at least one of the following:
specific files to push, a time of day to push files, to which host to push certain files, a number of files to push simultaneously to a host, a number of files to push simultaneously across a plurality of hosts, an amount of bandwidth to use during a push, a pattern to be matched in a file name or file contents of a file to be pushed, time periods during a day to push files with specified attributes, parameters for pushing files that have a timestamp within a predetermined range, parameters for pushing certain files that have a timestamp within specified minutes within hours of a day, parameters for pushing files that have a timestamp within specified hours within a day, a maximum number of files that can be pushed within a predetermined time period, or combinations thereof.

37. The system of claim 27, wherein if two or more configuration levels are read, the host configuration level overrides the global configuration level, and the application configuration level overrides both the host and the global configuration levels.

38. The system of claim 27, further comprising determining, by the local host, that at least one of at least one file meeting the configuration criteria has not been retrieved from the retrieval host and at least one file meeting the configuration criteria has not been pushed to the push host occurs.

39. The system of claim 27, wherein the configuration criteria comprises information related to a status of any, or combinations of, the retrieval host and the push host.

\* \* \* \* \*